2,715,115

CATALYST SYSTEM FOR THE EMULSION CO-POLYMERIZATION OF BUTADIENE AND STYRENE

Joseph A. Blanchette, Springfield, and Roger G. Richards, Granby, Mass., assignors to Monsanto Chemical Company, St. Louis, Mo., a corporation of Delaware No Drawing. Application October 30, 1952,
Serial No. 317,822

4 Claims. (Cl. 260—84.3)

This invention relates to the emulsion polymerization of vinylidene compounds. More particularly the invention relates to a catalyst system for the polymerization of vinylidene compounds in aqueous emulsion.

Polymerization of vinylidene compounds in aqueous emulsion is becoming the principal process for the preparation of a great majority of vinylidene polymers and copolymers. One of the important discoveries which enabled the emulsion process to be used extensively was the so-called "redox" catalyst system comprising broadly an oxidizing agent and a reducing agent. The redox catalysts accelerate the reaction at elevated temperatures but must be further activated at lower temperatures by the inclusion of small amounts of salts of metals of the transition series in the periodic table. Generally the metals are used in the form of salts of phosphorus acids.

When it is desired to use the emulsion polymers and copolymers in the emulsion form as water paints, it is found that the presence of the transition metals and the phosphate radicals appreciably lowers the weather resistance of the coatings prepared from the emulsions. In addition, many of the redox systems require a considerable amount of emulsifying agent to keep the system in an emulsion form throughout the polymerization. The large amount of emulsifying agent remains in the emulsion and contributes to the water-sensitivity of the coating derived from the emulsion.

One object of this invention is to provide emulsion polymers and copolymers of vinylidene compounds.

A further object is to provide an improved emulsion polymerization system.

Another object is to provide emulsion paints which are resistant to weathering.

Still another object is to provide emulsion paints of relatively low viscosity, relatively large particle size and good weatherability.

These and other objects are attained by polymerizing vinylidene compounds in aqueous emulsion in the presence of a small amount of a sodium alkyl benzene sulfonate as dispersing agent and a redox catalyst system consisting of a substituted isopropyl hydroperoxide and sodium formaldehyde sulfoxylate, said emulsion polymerization being carried out in the substantial absence of the transition elements.

The following example is given in illustration and is not intended as a limitation on the scope of this invention. Where parts are mentioned they are parts by weight.

*Example*

Dissolve 0.05 part of salt-free sodium dodecyl benzene sulfonate in 120 parts of water. Add to the solution 0.5 part of the sodium salt of a naphthalene sulfonic acid-formaldehyde condensate. Prepare a second solution by dissolving 0.5 part of diisopropyl benzene hydroperoxide and 0.8 part of a mixture of tertiary alkyl mercaptans containing 12–16 carbon atoms in the alkyl groups in 67 parts of styrene monomer. Mix the two solutions with vigorous agitation and add 33 parts of butadiene. Heat the mixture at 55° C. under constant agitation and sufficient pressure to prevent volatilization of the butadiene. As soon as 55° C. is attained in the reaction medium, add a solution of 0.1 part of sodium formaldehyde sulfoxylate in 2 parts of water slowly enough to prevent a substantial rise in the reaction temperature. Addition of the sodium formaldehyde sulfoxylate solution should be completed in about 5 hours. Thereafter continue the heating at 55° C. under constant agitation for about 7 hours more. The product is an aqueous emulsion of a copolymer of butadiene and styrene. Conversion to copolymer is about 97% complete in this 12 hour cycle making the removal of unreacted monomer a minor problem. The emulsion has a solids content of about 44% and a viscosity of about 13 cps. The particle size in the latex as evidenced by electron micrographs averages between 0.2 and 0.25 micron with only a few particles being outside this range.

The emulsion so produced may be used directly as a paint to provide a clear substantially colorless coating which is stable to weathering over extended periods of time and from which there is no evidence of efflorescence of salts. Pigments may be dispersed in the emulsion to provide colored coatings.

Using the same system as in the example, vinyl chloride may be homopolymerized at 50° C. in about 10 hours and styrene may be polymerized at 100° C. in about 3 hours to yield latices of particle size above 0.2 micron and a viscosity of less than 15 cps. These latices may be used when properly plasticized as interior or exterior coatings which are clear and substantially colorless. They may be modified by the incorporation of pigments as desired to obtain tough weather resistant colored coatings.

The emulsifying agent in the example is the sodium dodecyl benzene sulfonate. It may be replaced by other alkyl benzene sulfonates in which the alkyl group contains from 10 to 20 carbon atoms. Among the applicable emulsifying agents are the sodium sulfonates of decyl benzene, hexadecyl benzene, octadecyl benzene, nonadecyl benzene and docosanyl benzene. These emulsifying agents should be refined before use to remove substantially all salts. Other well-known emulsifying agents such as soaps, sulfates, etc. are not operative in this invention. The amount of emulsifying agent is restricted to between 0.01 and 0.1 part per 100 parts of monomer.

The sodium salt of the naphthalene sulfonic acid-formaldehyde condensate of the example is a latex stabilizer. It apparently plays little or no part in the emulsion polymerization process since if it is left out the polymerization proceeds normally but the product is not a stable latex and if no sodium alkyl benzene sulfonate is used the polymerization system is inoperative. The main function, therefore of the sodium naphthalene-formaldehyde sulfonate is the stabilization of the polymer latex against premature coagulation or resolution of the latex. The amount of the latex stabilizer may vary between 0.05 and 1.0 part per 100 parts of monomer. Other known emulsion stabilizers such as polyvinyl alcohol, methyl cellulose, agar agar are ineffective in the system of this invention. The latex stabilizers are formed by condensing a naphthalene sulfonic acid with formaldehyde and neutralizing the product with sodium hydroxide. The condensation products and methods for their preparation are disclosed in detail in U. S. Patent to Schmidt No. 1,336,759, dated April 13, 1920.

To obtain latices which are stable over long periods of time it is sometimes necessary to add secondary emulsifying agents during the course of the polymerization. This is particularly true when the polymers or copolymers prepared have relatively low softening points since any agglomeration of particles of such polymers which may occur is difficult, if not impossible, to redisperse. The secondary emulsifying agents should be added slowly to the reaction medium, starting at about the point of the last addition of sodium formaldehyde sulfoxylate and should continue until the reaction is completed.

For the best results the secondary emulsifying agent should be a mixture of a nonionic polyether alcohol and a sodium alkyl aryl sulfonate. The latter may be the same as the primary emulsifying agent or different therefrom. The polyether alcohols are prepared by the reaction of ethylene oxide or other olefin oxide on alcohols or phenols or mixtures thereof. The greatest stability is obtained by adding from 3 to 7 parts of the mixture with the weight ratio in the mixture of polyether alcohol to sulfonate varying from 1:5 to 5:1. The secondary emulsifier should be added as an aqueous solution containing from 1 to 10 parts of emulsifier mixture to 10 parts of water.

The redox system consists of sodium formaldehyde sulfoxylate and a substituted isopropyl hydroperoxide. Other reducing agents such as reducing sugars, sulfoxy compounds, etc. require the presence of transition elements as accelerators which contribute to the poor weatherability of emulsion made therewith. The hydroperoxides which should be used have the formula

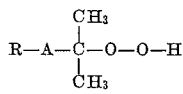

wherein A is a benzene ring or a cyclohexyl ring and R is hydrogen or alkyl in which the alkyl group contains from 1 to 5 carbon atoms. Among the hydroperoxides which may be used are cumene hydroperoxide, di-isopropyl benzene hydroperoxide, para tertiary butyl isopropyl benzene hydroperoxide, para menthane hydroperoxide, etc. The amount of hydroperoxide may vary between 0.25 to 0.5 part per 100 parts of monomer and the sodium formaldehyde sulfoxylate may vary between 0.05 and 0.10 part per 100 parts of monomer. The relation between the hydroperoxide and the sulfoxylate must also be controlled so that about 5 parts of hydroperoxide are used for each part of sulfoxylate.

The modifier used in the example is a commercial mixture of alkyl mercaptans containing from 12 to 16 carbon atoms. Single alkyl mercaptans containing from 10 to 20 carbon atoms or mixtures thereof are effective in the system of this invention in amounts ranging from 0.5 to 1.0 part per 100 parts of monomer. Outside this range they are either ineffective or alter the properties of the polymers to such an extent that they are of little use. Other modifiers such as the thiuram disulfides and various xanthogenic compounds are not weather stable in the system of this invention.

In carrying out the process of this invention, there are various precautions to be taken. The emulsifying agent and the emulsion stabilizer are water-soluble and should be dissolved in the water prior to the addition of monomers and catalyst. It is often desirable to boil the water solution for a short while to remove occluded oxygen prior to the polymerization step. Under some conditions, it may be desirable to dissolve only a portion of the emulsifying agent in the water and add the rest in increments during the course of the reaction.

The hydroperoxides are substantially water-insoluble and should be dissolved or dispersed along with the alkyl mercaptan in the monomer to be polymerized. This solution may then be added to the aqueous solution accompanied by agitation prior to the start of polymerization.

The sulfoxylate is water-soluble and should be added in the form of an aqueous solution to the reaction medium. It should be added slowly over an extended period of time. The rate of addition may be easily controlled in connection with the temperature of the reaction medium. If the temperature is below that desired, more sulfoxylate should be added. If the temperature is too high, the rate of addition of the sulfoxylate should be slowed until the temperature reaches the proper range.

It is possible to reverse the order of addition of the hydroperoxide and the sulfoxylate by dissolving the sulfoxylate in the aqueous phase and then adding the catalyst slowly during the course of the reaction. This procedure is less readily controllable but can be made to work by careful observation of the reaction conditions.

The water used in the process of this invention must be substantially free of dissolved salts and particularly of salts of the transition elements of the periodic system. In many areas, the ordinary water supply will not be suitable and will have to be treated to remove an excess of naturally occurring salts. Particularly undesirable are salts of iron, cobalt, nickel, copper, zinc, etc., all of which may be included within the terminology "transition elements." The maximum allowable concentration of these elements in the water is 10 parts per million and the most beneficial results of this process are not obtained unless the concentration of these elements is less than 6 p. p. m. The amount of water used may vary from 100 to 150 parts per 100 parts of monomer. If more water is used the latices are too dilute and the particle size of the polymers and copolymers is below the efficient size for paint applications.

The process of this invention is applicable to the polymerization and copolymerization of vinyl and vinylidene compounds which are insoluble in water or soluble only to the extent of about 10%. Thus polymers and copolymers of vinyl esters, vinyl ethers, vinyl halides, vinyl benzenes, dienes, olefins, isoolefins, acrylic nitriles, acrylic esters, etc., may be prepared using the system of the invention. The temperature and pressure of the reaction will depend upon the particular monomer or monomers used and will not vary substantially from the conditions ordinarily used for the materials in question.

The products of this invention are latices having a relatively low viscosity, i. e., between 10 and 15 cps. The size of the particles in the latices will average greater than 0.2 micron and the number of outsize particles is quite small i. e., substantially all of the particles will be of about the same size. The latices may be modified by the incorporation therein of plasticizers, pigments, dyes, etc. The low viscosity of the latices is convenient for using them directly as aqueous emulsion paints which may be applied by brushing, roll coating, spraying and other conventional methods. Since there is no problem of oxidizing any of the components of the paint, the film is in its final condition as soon as the water dries therefrom, i. e., there is no lasting tackiness of the film and no progressive embrittlement thereof over extended periods of time.

It is obvious that variations may be made in the products and processes of this invention without departing from the spirit and scope thereof as defined by the appended claims.

What is claimed is:

1. A process as in claim 4 wherein the catalyst is diisopropyl benzene hydroperoxide.

2. A process as in claim 4 wherein from 3 to 7 parts of a secondary emulsifying agent comprising a mixture of a nonionic polyether alcohol and a sodium alkyl aryl sulfonate is added to the reaction medium after the last addition of sodium formaldehyde sulfoxylate, said addition being made slowly and continuing to the end of the reaction cycle, the weight ratio of polyether alcohol to sodium alkyl aryl sulfonate varying between 5:1 and 1:5.

3. A process for the copolymerization of butadiene and styrene which comprises dissolving 0.05 part of sodium dodecyl benzene sulfonate and 0.5 part of the sodium salt of a naphthalene sulfonic acid-formaldehyde condensate in 120 parts of water, dissolving 0.5 part of di-isopropyl benzene hydroperoxide and 0.8 part of a mixture of tertiary alkyl mercaptans containing from 12 to 16 carbon atoms in the alkyl group in 67 parts of styrene monomer, mixing the two solutions with agitation and adding thereto 33 parts of butadiene heating the resultant reaction mixture to 55° C. under sufficient pressure to prevent volatilization of the butadiene, adding to the reaction mixture a solution of 0.1 part of sodium formaldehyde sulfoxylate in 2 parts of water over a period of 5 hours and at such a rate that the reaction temperature remains substantially constant and thereafter continuing the reaction at 55° C. for about 7 hours, the entire polymerization system containing less than 10 parts per million of the transition elements of the periodic system.

4. A process for the copolymerization of styrene and butadiene in an aqueous emulsion system which comprises dissolving from 0.01 to 0.1 part of a sodium alkyl benzene sulfonate in which the alkyl groups contain from 10 to 20 carbon atoms and from 0.05 to 1.0 part of a sodium salt of a naphthalene sulfonic acid-formaldehyde condensate in from 100 to 150 parts of water, dissolving from 0.25 to 0.5 part of a catalyst in the styrene and adding thereto from 0.5 to 1.0 part of an alkyl mercaptan containing from 10 to 20 carbon atoms in the alkyl group, mixing the two solutions with agitation and adding the butadiene thereto, heating the resultant reaction mixture to polymerization temperature, adding to the reaction mixture an aqueous solution of sodium formaldehyde sulfoxylate over an extended period of time while maintaining the reaction temperature substantially constant and thereafter continuing the reaction at substantially the same temperature until the reaction is substantially complete, the said catalyst being taken from the group consisting of compounds having the formula

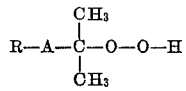

wherein A is taken from the group consisting of benzene and cyclohexane rings and R is taken from the group consisting of hydrogen and alkyl groups containing from 1 to 5 carbon atoms, the weight ratio of catalyst to sulfoxylate being substantially 5 to 1 and the entire polymerization system containing less than 10 parts per million of the transition elements of the periodic system, the sum total of styrene and butadiene monomer equaling 100 parts.

No references cited.